United States Patent
Deau

(10) Patent No.: US 9,676,136 B2
(45) Date of Patent: Jun. 13, 2017

(54) CONTROL SYSTEM OF A CONTAINER FORMING UNIT COMPRISING A MASTER CONTROL UNIT AND SLAVE CONTROLLERS

(71) Applicant: SIDEL PARTICIPATIONS, Octeville sur Mer (FR)

(72) Inventor: Thierry Deau, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 365 days.

(21) Appl. No.: 14/410,288

(22) PCT Filed: Jul. 9, 2013

(86) PCT No.: PCT/FR2013/051641
§ 371 (c)(1),
(2) Date: Dec. 22, 2014

(87) PCT Pub. No.: WO2014/009654
PCT Pub. Date: Jan. 16, 2014

(65) Prior Publication Data
US 2015/0321412 A1 Nov. 12, 2015

(30) Foreign Application Priority Data
Jul. 13, 2012 (FR) ...................................... 12 56832

(51) Int. Cl.
*B29C 49/78* (2006.01)
*B29C 49/06* (2006.01)
(Continued)

(52) U.S. Cl.
CPC .............. *B29C 49/06* (2013.01); *B29C 49/78* (2013.01); *B29C 49/783* (2013.01);
(Continued)

(58) Field of Classification Search
CPC ..................... B29C 49/783; G05B 2219/2231
See application file for complete search history.

(56) References Cited

U.S. PATENT DOCUMENTS

| | | | |
|---|---|---|---|
| 6,120,712 A * | 9/2000 | Chase | B29C 49/56 264/40.5 |
| 6,264,457 B1 * | 7/2001 | Ohmes | B29C 49/4205 198/481.1 |

(Continued)

FOREIGN PATENT DOCUMENTS

| | | |
|---|---|---|
| DE | 10 2010 033171 A1 | 2/2012 |
| EP | 1 306 195 A2 | 5/2003 |

(Continued)

OTHER PUBLICATIONS

International Search Report, dated Oct. 2, 2013, from corresponding PCT application.

*Primary Examiner* — Robert B Davis
(74) *Attorney, Agent, or Firm* — Young & Thompson

(57) ABSTRACT

A control system (34) for a unit (9) for forming containers (2) from blanks (3) provided with a series of forming stations (10) each provided with a mold (11), the system (34) including a master control unit (36) and a series of slave controllers (37) each associated with at least one forming station (10), each controller (37) being programmed to: control the or each associated forming station (10) according to a forming command (CF) loaded in the controller (37); take into account a pressure measurement in the mold (11), from this measurement, establish a blowing curve describing the change in the fluid pressure in the mold (11), analyze the blowing curve and extract therefrom the coordinates of at least one singular point (S); communicate the singular point (S) to the control unit (36).

10 Claims, 3 Drawing Sheets

(51) Int. Cl.
  *G05B 19/18* (2006.01)
  *B29C 49/12* (2006.01)
  *B29C 49/36* (2006.01)
  *B29C 49/64* (2006.01)

(52) U.S. Cl.
  CPC ............ B29C 49/786 (2013.01); G05B 19/18 (2013.01); *B29C 49/36* (2013.01); *B29C 49/6418* (2013.01); *B29C 2049/1295* (2013.01)

(56) References Cited

U.S. PATENT DOCUMENTS

| | | | | |
|---|---|---|---|---|
| 6,544,023 | B2* | 4/2003 | Hofmann | B29C 45/76 |
| | | | | 425/143 |
| 7,712,601 | B2* | 5/2010 | Shimomura | G05B 19/4062 |
| | | | | 198/478.1 |
| 8,721,940 | B2* | 5/2014 | Monin | B29C 49/58 |
| | | | | 264/40.3 |
| 2010/0201013 | A1 | 8/2010 | Monin et al. | |
| 2012/0326345 | A1* | 12/2012 | Gendre | B29C 49/78 |
| | | | | 264/40.1 |
| 2013/0187304 | A1 | 7/2013 | Deau et al. | |
| 2015/0190959 | A1* | 7/2015 | Deau | B29C 49/783 |
| | | | | 264/40.3 |

FOREIGN PATENT DOCUMENTS

| | | |
|---|---|---|
| EP | 2 098 356 A2 | 9/2009 |
| FR | 2 909 305 A1 | 6/2008 |
| JP | 4184502 B2 | 11/2008 |
| WO | 2008/081107 A2 | 7/2008 |
| WO | 2012/035260 A1 | 3/2012 |

\* cited by examiner

CONTROL SYSTEM OF A CONTAINER FORMING UNIT COMPRISING A MASTER CONTROL UNIT AND SLAVE CONTROLLERS

The invention relates to the field of forming containers from blanks made of thermoplastic material such as PET (polyethylene terephthalate), with the term "blank" covering both a preform that has been injected and an intermediate container that has undergone one or more temporary forming operations.

The forming of a container is carried out by blow molding or drawing-blow molding from a blank that has undergone a previous heating operation. The hot blank is introduced into a mold with the imprint of the container; a pressurized fluid (in particular a gas such as air) is then injected into the blank to impart to it the shape of the container by counter-imprint in the mold. The blank can also undergo drawing by means of a sliding rod so as to minimize offsetting and to make the distribution of the material uniform.

The forming of the containers on the industrial scale imposes extremely short cycle times. For an ordinary modern production rate (on the order of 50,000 containers per hour), the cycle time, measured between the introduction of the blank into the mold and the evacuation of the formed container, is between 1 second and 2 seconds only. The manufacturers aim for even higher production rates, with the goal of 100,000 containers per hour being deemed reasonable in the medium term. At this rate, the individual production of each mold is several thousand containers per hour.

The risk of shape defects appearing and affecting the containers increases, however, in proportion to the increase in the production rate. The number of the most frequent shape defects include poor imprint-taking and poor distribution of the material, which are often correlated. It is known that these defects can be linked to various machine parameters, in particular the temperature for heating blanks, the pressure and the flow rate of fluid, or else the drawing speed.

The manual modification of these parameters assumes a fine knowledge, by the operators, of correlations that can exist between the variation applied to a given parameter and the consequence of this variation on the correction of a shape defect. In view of the errors noted and the slowness of the process keeping the operator free from making instantaneous adjustments to the machine, several manufacturers are engaged in an integral automation of the directing of the machine.

The applicant has already contributed to this trend by systematizing the analysis of blow-molding curves to detect therein singular points able to indicate the conformity (or, in contrast, the non-conformity) of the container to a predefined model, the modification of machine parameters able to be controlled in the case of non-conformity, cf. in particular the documents WO 2008/081107 and WO 2012/035260.

It is known to direct the machines by means of automated control systems.

It can be considered to centralize the machine control within a single system, which for the latter simultaneously involves conducting:

In real time, operations for directing the cycle in progress by controlling the elements of the machine according to preestablished instructions, such as the pressure and the flow rate of blow molding, or else the drawing rate, or else operations for measuring parameters (for example, the pressure prevailing in the container during forming), In delayed time, operations useful for the proper execution of the following cycle(s), the analysis of measurements, the calculation, and the implementation of new instructions.

Such centralization, however, runs into the limits of the performance of the processors because of the high volume of data to be processed and the speed at which these data are to be processed to maintain the pace of production. The risk of causing an overload of the processor, resulting in a malfunction of the machine, is high. An obvious solution would be to limit the production rates or the number of forming stations per machine, but this solution would run counter to the requirements of the market, heading instead toward increased production rates.

In the European patent application EP 2 098 356, it is proposed to assign a control system to each blow-molding station of a blow-molding wheel, with each system controlling both the injection and the driving of a drawing element. In other words, this document proposes to totally decentralize the machine control, with the exception of initiating operations, which is controlled by a central system, which receives from a sensor a piece of data on the angular position of the blow-molding wheel, relayed to the control system of each blow-molding station.

Such a decentralization is not, however, completely satisfactory. Actually, with each control system being autonomous, the quality of the containers that are produced may drift without it being easy to detect the causes thereof and the location on the machine. In other words, it is possible to note variations in the quality of the containers produced without it being possible, however, to make it uniform.

A first object of the invention is to optimize the control of a machine (or unit) for forming containers.

A second object is to promote an increase in the capacities for production, and in particular an increase in the production rates.

A third object is to optimize (and in particular to make uniform) the quality of containers produced on a forming machine.

For this purpose, first of all a system for controlling a unit for forming containers from blanks made of thermoplastic material equipped with a series of forming stations, each equipped with a mold with the imprint of a container, is proposed, with this system comprising a master control unit and a series of slave controllers tied to the master control unit and each associated with at least one forming station, each controller being programmed for:

Directing the forming station or each associated forming station according to a forming instruction loaded into the controller;

Taking into account a measurement of pressure in the mold,

Based on this measurement, plotting a blow-molding curve describing the change in the fluid pressure in the mold, Analyzing the blow-molding curve and extracting from it the coordinates of at least one singular point, Communicating the singular point to the control unit, With the control unit being programmed for:

Directing the controllers,

Taking into account the singular point or each singular point communicated by each controller, Calculating a characteristic point that is a function of the singular point(s), Comparing the characteristic point with a theoretical point memorized in the control unit, If a variation is declared between the characteristic point and the theoretical point, issuing a corrected forming instruction, Loading the corrected forming instruction into the controller or each controller.

Various additional characteristics can be provided, by themselves or in combination:

The characteristic point is an average of singular points communicated by the same controller or by multiple controllers;

Each controller is associated with two forming stations;

With each forming station being equipped with an injection device comprising a block of actuators directed by the controller, the forming instruction comprises values of pressure and/or of the flow rate of a fluid delivered by said block, or a control time of the actuator block;

With each forming station comprising a moving part (for example, a drawing rod) whose movement is directed by the controller, the instruction comprises a movement profile of the part;

With the forming stations describing a path including a forming sector extending from a point for loading blanks to a point for unloading the formed containers, and a buffer sector, complementary to the forming sector and extending from the unloading point to the loading point, the control unit is programmed to load the modified forming instruction into the controller or each controller when the forming station or each associated forming station is found in the buffer sector;

With the forming unit comprising a wheel on which are mounted the forming stations, and an angular position sensor of the wheel, each controller is programmed to take into account the instantaneous angular position of the wheel, by deducing the angular position of the forming station or each associated forming station and by plotting the blow-molding curve from pressures measured at times corresponding to each of these angular positions.

Secondly, a unit for forming containers from blanks made of thermoplastic material, equipped with a series of forming stations each equipped with a mold with the imprint of a container, and a control system as presented above, is proposed.

Thirdly, an installation for producing containers from blanks made of thermoplastic material, equipped with a forming unit as mentioned above, is proposed.

Other objects and advantages of the invention will be brought out in the description of a preferred embodiment, given below with reference to the accompanying drawings, in which.

Figure 1:
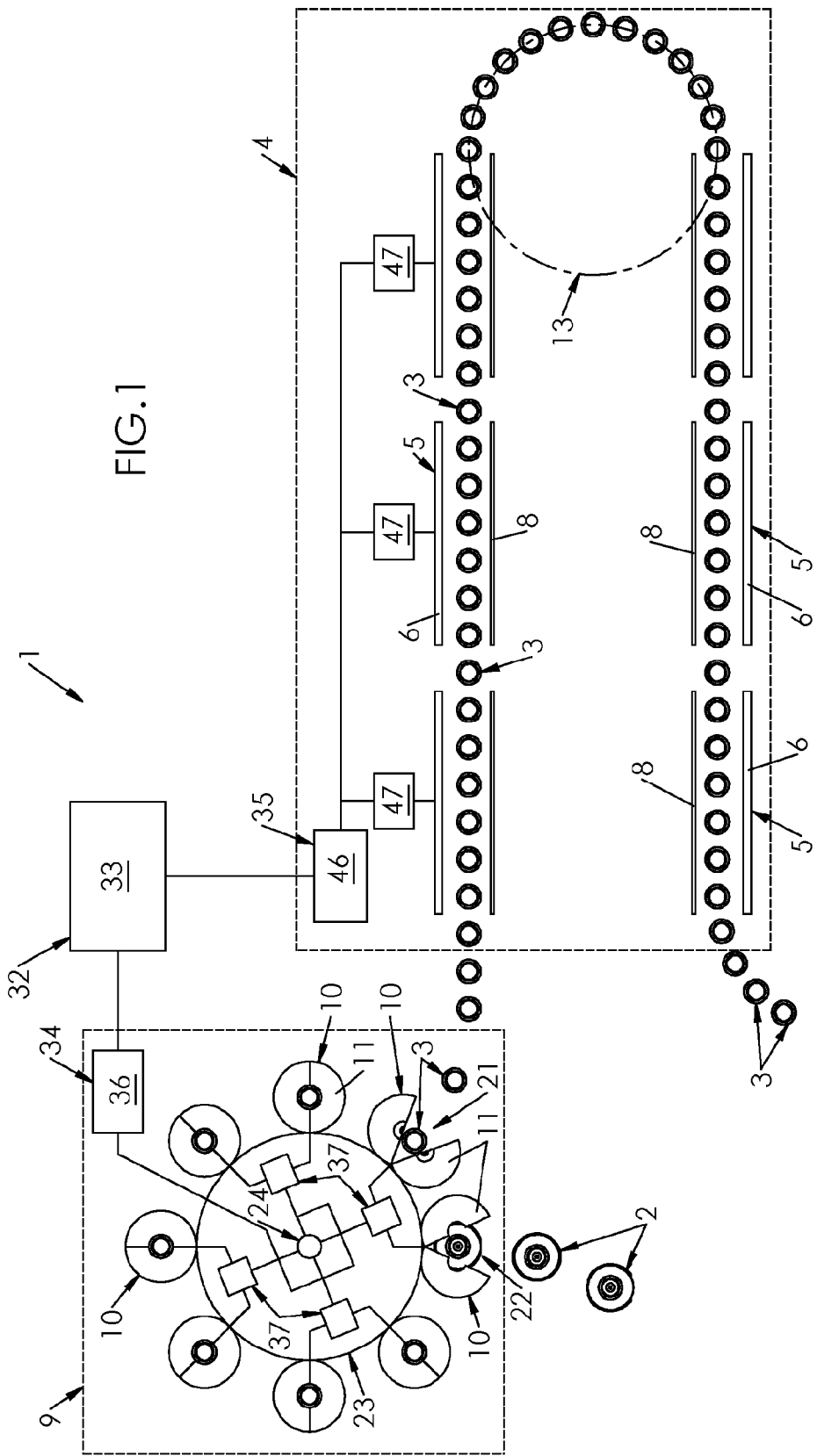
FIG. 1 is a diagrammatic view showing an installation for producing containers, comprising a forming unit and a heating unit.
Figure 2:
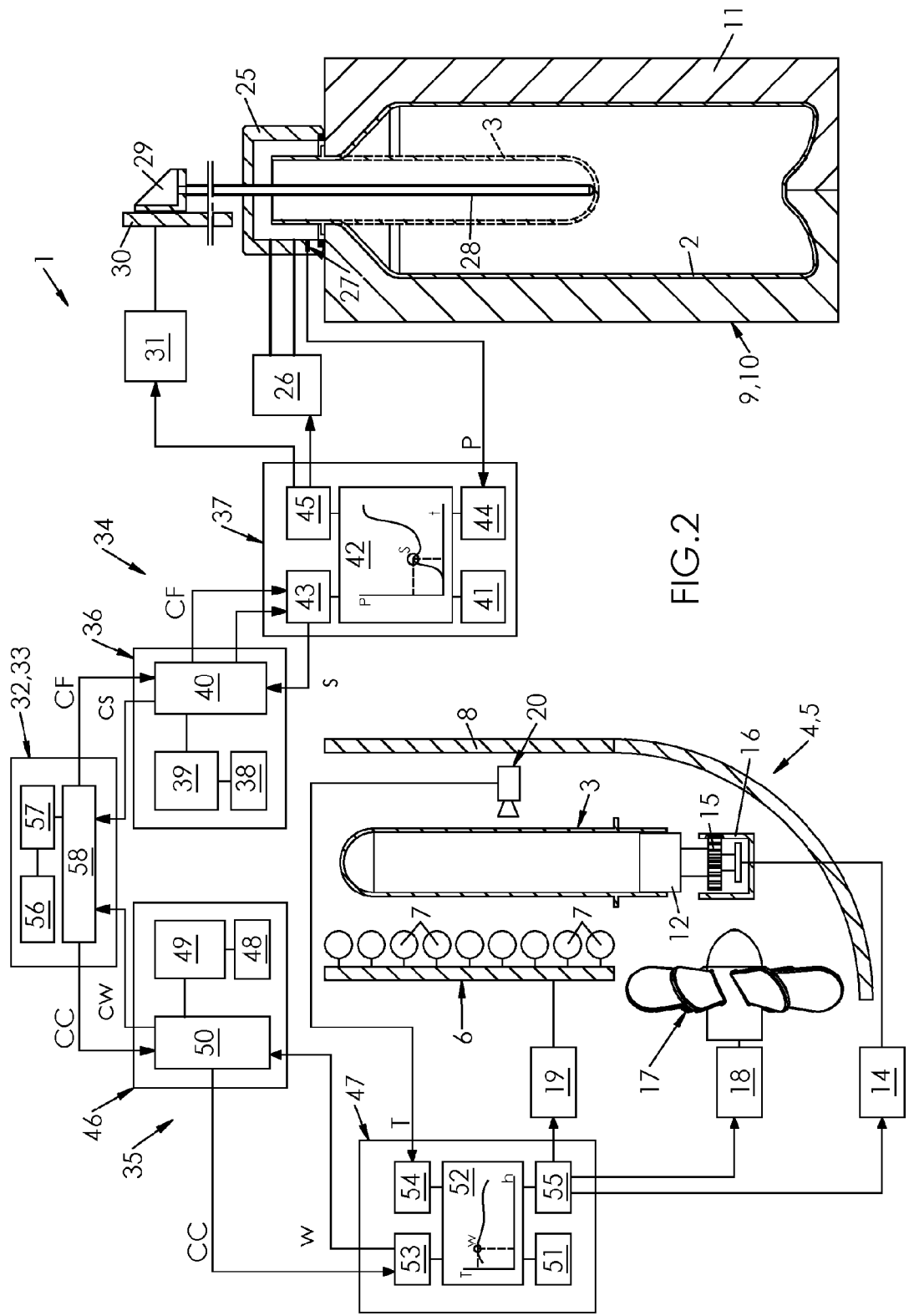
FIG. 2 is a diagrammatic view illustrating in greater detail the architecture of the installation.

FIGS. 1 and 2 diagrammatically show an installation 1 for producing containers 2 from blanks 3 made of thermoplastic material, for example made of PET (polyethylene terephthalate).

The installation 1 comprises at least two units 4, 9 for processing containers 2 or blanks 3. For the sake of simplicity, it is assumed below that the blanks 3 are preforms.

Typically, as in the illustrated example, the installation comprises:

A heating unit 4 or oven, which comprises a series of heating modules 5, each having a radiant wall 6 equipped with superposed sources 7 of infrared radiation and a reflecting wall 8 placed facing the radiant wall 6 for reflecting the portion of radiation that is not absorbed by the preforms 3, A unit 9 for forming by blow molding or drawing-blow molding, equipped with at least one forming station 10 (and in this case a series of stations), with the forming station or each forming station 10 being equipped with a mold 11 with the imprint of a container.

In a standard way, the preforms 3 at ambient temperature are introduced into the oven 4 by an input of the latter, for example by means of a wheel or a supply conveyor. Then, the preforms 3 are heated in a stream in the oven 4 at a temperature higher than the glass transition temperature of the material (the final temperature of the blanks is on the order of 120° C. for the PET, whose glass transition temperature is approximately 80° C.).

In the oven 4, the preforms 3 are mounted, for example, on pivoting supports 12 or spinners. Each spinner 12 is mounted on a chain circulating on a driving wheel 13 driven in rotation by a motor 14. The spinner 12 is equipped with a pinion 15 that engages a rack 16 to drive the spinner 12 in rotation during its passage into the oven 4 and thus to expose the surface of each preform 3 to radiation.

To evacuate at least a portion of the excess heat produced by the radiant wall 6, the oven 4 can be equipped with an extraction system comprising, for example, a fan 17 driven by a motor 18 and positioned facing the necks of the preforms 3.

In addition, the power of the radiation emitted by the radiant wall 6 can be modulated by means of a power variable-speed drive unit 19, as in the example embodiment illustrated in FIG. 2.

The thermal profile of the preforms 3 is preferably controlled, either directly in the oven 4 or at the outlet of the latter, by means of a thermal sensor 20. According to an illustrated embodiment in FIG. 2, the thermal sensor 20 is a thermal camera pointing toward the preforms 3.

At the outlet of the oven 4, the thus heated preforms 3 are transferred to the forming unit 9 via a transfer unit (such as a transfer wheel) to be blow-molded or drawn-blow-molded individually in a mold 11. The preforms 3 are introduced into the forming unit 9 at a loading point 21.

At the end of the forming, the containers 2 are evacuated from the molds 11 from an unloading point 22 for the purpose of being directly filled and labeled, or stored temporarily for the purpose of being filled and subsequently labeled. Once filled and labeled, the containers are grouped and packaged, for example, within a plastic-wrapping unit that envelops each group of containers in a heat-shrinkable film.

As is also seen in FIGS. 1 and 2, the forming unit 9 comprises a pivoting wheel 23 on which are mounted the forming stations 10 and a sensor 24 to detect the instantaneous angular position of the wheel 23, in the form of, for example, a coder (i.e., in practice, an instrument-equipped bearing device).

Each forming station 10 is equipped with a nozzle 25, by which a fluid (in particular a gas such as air) is injected into the mold 11. Each forming station 10 is also equipped with an injection device comprising an actuator block 26 connected to the nozzle 25 for controlling the injection of the fluid. In addition, each forming station 10 is equipped with a device 27 for measuring the prevailing pressure in the container during forming. In the illustrated example, the measuring device 27 comprises a pressure sensor mounted on the nozzle 25, in which the pressure in the course of forming is identical to the pressure prevailing in the container 2.

According to an embodiment corresponding to a process for forming by drawing-blow molding, each forming station 10 also comprises a moving drawing rod 28, integral with a carriage 29 mounted in translation relative to a support 30.

The movement of the rod 28 is controlled in an electromagnetic manner. For this purpose, the support 30 comprises an electromagnetic track connected to a motor 31, and the carriage 29 itself is magnetic. The sign and the power of the current passing through the track make it possible to move the rod 28 along a predetermined movement profile, comprising a direction and a speed of motion.

As illustrated in FIG. 1, the forming stations 10 describe a path (in this case circular) that includes a forming sector F extending from the loading point 21 of the preforms 3 to the unloading point 22 of the containers 2 that are formed, and a buffer sector T, complementary to the forming sector F and extending from the unloading point 22 to the loading point 21.

The installation 1 is equipped with a control system 32 that comprises a central unit 33 for control of the installation 1, and, for each processing unit 4, 9, a dedicated control system 34, 35 that in an automatic way directs the operation of the respective unit 9, 4.

Thus, the forming unit 9 is equipped with a dedicated control system 34 that comprises a master control unit 36 and a series of slave controllers 37 tied to the master control unit 36.

The master control unit 36 is computerized and comprises, as illustrated in FIG. 2:
A memory 38 into which programs for directing the forming unit 9 are entered,
A processor 39 connected to the memory 38 for applying the instructions of the programs, and
A communication interface 40 connected to the processor 39 for communication with external communicating entities, as will be explained below.

Each slave controller 37 is a programmable logic controller of the type described in W. Bolton, *Programmable Logic Controllers*, Newnes, 5$^{th}$ Edition, 2009.

More specifically, each controller 37 comprises:
A memory 41 into which programs for directing at least one forming station 10 are entered,
A processor 42 connected to the memory 41 for applying the instructions of the program,
A communication interface 43 connected to the processor 42 for communication with the master control unit 36 via the communication interface 40,
An input interface 44 connected, on the one hand, to the processor 42, and, on the other hand, to the device 27 for measuring the pressure, denoted P, prevailing in the mold 11,
An output interface 45 connected, on the one hand, to the processor 42 and, on the other hand, to the actuator block 26 and to the control motor 31 of the drawing rod 28.

As a variant, the input and output interfaces 44, 45 are assembled within an input/output unit interface.

The controller 37 is programmed to carry out the following operations:
Directing the forming station 10 with which it is associated (or each forming station 10 with which it is associated; the controller 37 can, for example, be associated with two forming stations 10) for performing a complete forming cycle along the forming sector F, from the loading of a preform 3 at the loading point 21 to the unloading of the formed container 2 at the unloading point 22, according to a forming instruction CF that is loaded (i.e., written) into the memory 41;
Taking into account a measurement of the pressure P in the mold 11. The measurement of pressure is carried out by the pressure sensor 27 continuously or in a sequential and uniform manner, at predetermined intervals (for example, 5 ms) and communicated to the processor 42 via the input interface 44;
Based on the measurement of pressure, plotting during the forming cycle a blow-molding curve describing the changes in the fluid pressure P in the mold 11 at any time, denoted t (in practice, at times, measured by the internal clock of the processor 42, corresponding to the angular positions provided by the sensor 27), this curve (diagrammatically visible in FIG. 2) being plotted by the processor 42 and memorized during the cycle;
Analyzing, at the end of the cycle, the blow-molding curve and extracting from it the coordinates of at least one singular point S (in particular, a local pressure peak, typically a point B as defined in the international application WO 2008/081107);
Communicating, from the end of the cycle, the coordinates of the singular point to the master control unit 36.

The forming instruction can comprise pressure values and/or the flow rate of fluid delivered by the actuator block 26 or else a movement profile of the rod 28 or of any other moving part (for example, a mold bottom coupled to the rod 28), in the form of, for example, a speed curve of the motion of the rod 28 (or of any other moving part) based on its position. The speed of motion of the rod 28 (or of any other moving part) can be converted by the processor 42 of the controller 37 into power to be delivered by the motor 31. The instruction is applied by the processor 42, which directs the actuator block 26 and the motor 31 via the output interface.

The processor 39 of the master control unit 36 is, for its part, programmed for:
Directing its slave controllers 37,
Taking into account the singular point or each singular point S communicated by each controller 37 at the end of the cycle performed by the forming station or each associated forming station 10,
Calculating a characteristic point CS from the singular point(s) S. This characteristic point CS can be the singular point S itself, communicated during a single cycle by a controller 37, or an average of singular points S communicated during several successive cycles by the same controller 37, or an average of singular points S communicated during a single cycle by multiple controllers 37, or else an average of singular points S communicated during several successive cycles by multiple controllers 37;
Comparing this characteristic point CS, obtained (or calculated based on) measurements, with a theoretical point entered in advance into the memory 38 of the master control unit 36 and corresponding to a model container,
If a variation is declared between the characteristic point CS and the theoretical point, issuing a corrected forming instruction CF, comprising a pressure value and/or a fluid flow rate value that is modified to be delivered by the actuator block 26, or a control time of the actuator block 26, or else a movement profile of the rod 28 (for example, in the form of a speed curve of the rod 28 or a power curve of the motor 31, as a function of the position of the rod 28), or another moving part;

Loading the corrected forming instruction CF into the controller or each controller 37 directed by the master control unit 36, If necessary, communicating the characteristic point CS to the central control unit 33.

When no variation is declared between the characteristic point CS and the theoretical point, no corrected forming instruction is issued by the processor 39, in such a way that for the new forming cycle or several subsequent forming cycles, the slave controller 37 applies the forming instruction CF of the preceding cycle(s).

On the assumption, mentioned above, of a correction of the forming instruction CF, the new instruction CF is loaded into the slave controller 37 when the associated forming station 10 is in the buffer sector T, in such a way as to be able to be applied for the following forming cycle, from the loading of a new preform 2 at the loading point 21.

The angular position information of the wheel 23 is common to the controllers 37 and shared. It can be centralized at the level of the master control unit 36, whose processor 39 in this case is programmed to communicate, at predetermined intervals (in particular several milliseconds, for example 1 ms), via its communication interface 40, the instantaneous angular position of the wheel 23, as measured by the angular position sensor 24 in a polar coordinate frame of reference centered on the axis of rotation of the wheel, denoted O.

However, according to a preferred embodiment, the sensor 24 is connected directly, via a local computer network (LAN), to all of the controllers 37. In this case, so that the information transmitted by the sensor 24 via the network is readable by the controllers, the sensor 24 preferably integrates an analog/digital converter.

Each slave controller 37 is, for its part, programmed for:

Taking into account the instantaneous angular position of the wheel 23 as soon as this position is communicated to it by the master control unit 36 or directly by the angular position sensor 24, Deducing from it the angular position of the forming station or each forming station 10 associated with the slave controller 37 and directed by the latter, and Plotting the blow-molding curve from pressures measured in the nozzle 25 of each associated mold, at times corresponding to each of these angular positions.

Figure 3:
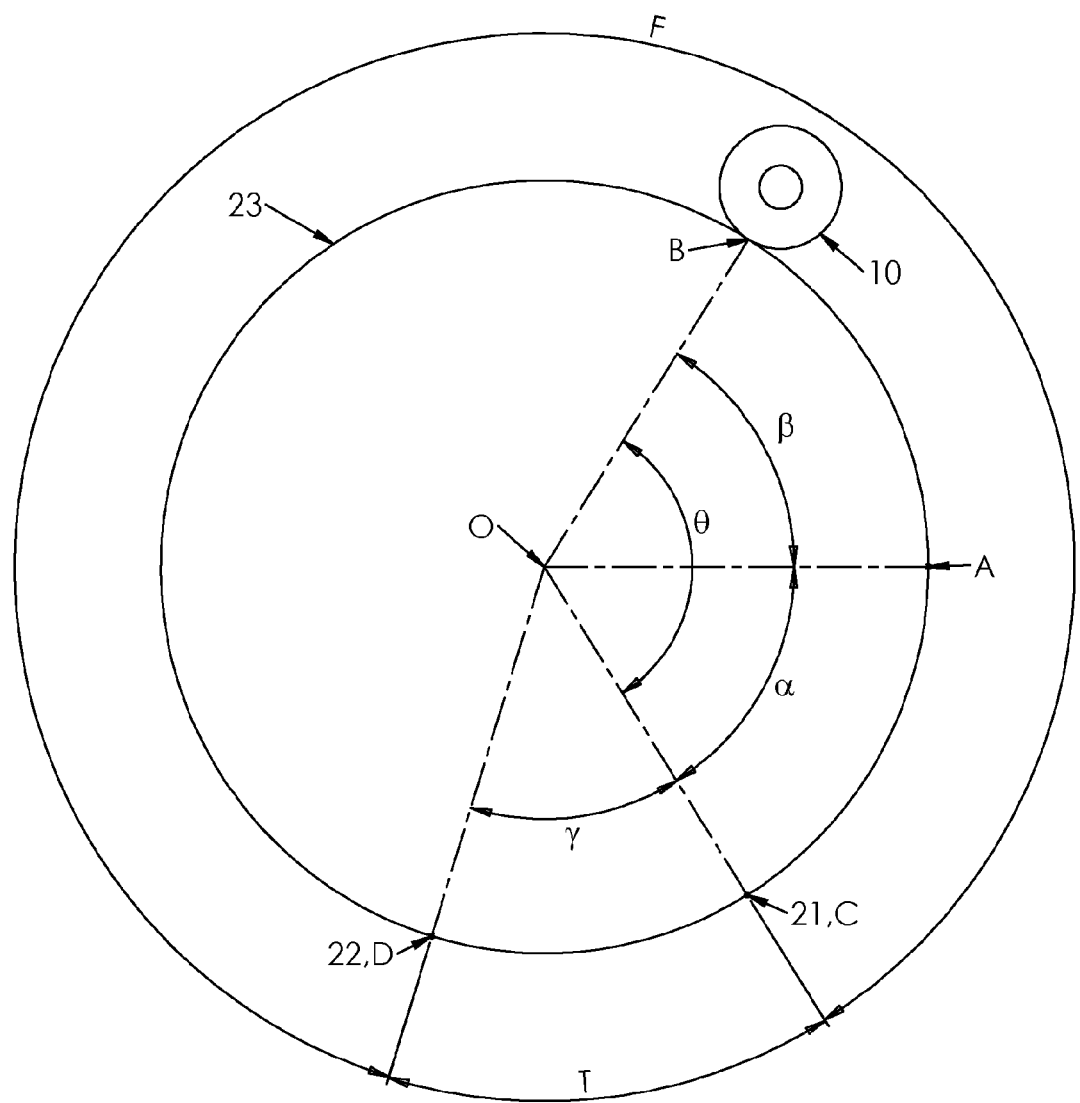
FIG. 3 is a diagrammatic view illustrating the angular positions of a wheel of the forming unit.

The calculation of the instantaneous angular position of each forming station 10 can be carried out in the following simple manner by taking as a reference (i.e., the zero angle) the loading point 21 (also denoted C in FIG. 3).

Denoted as A is a fixed arbitrary point on the wheel 23, considered to be a moving reference providing the angular position of the loading point C, denoted $\alpha$ and provided by the position sensor 24, such that $\alpha = \widehat{COA}$.

Denoted as B is the point corresponding to the relative angular position, denoted $\beta$, of the forming station 10, measured relative to the point A and such that $\beta = \widehat{AOB}$.

By denoting as $\theta$ the absolute angular position of the forming station 10 in the fixed polar frame of reference that has the OC axis as its origin, this angular position $\theta$ is such that $\theta = \widehat{COB} = \widehat{COA} + \widehat{AOB} = \alpha + \beta$.

Denoted as D is the unloading point 22 (fixed in the polar frame of reference of the OC axis), whose angular position, denoted $\gamma$, is such that $\gamma = \widehat{COD}$.

Thus, for any forming station 10, the processor 39 of the associated controller, into the memory 38 of which the values of the angles $\beta$ and $\gamma$ are entered, is at any time capable of calculating the angle $\theta$ by the formula indicated above and of determining if the forming station 10 is located in the forming sector F, in which $0 \leq \theta \leq 2\pi - \gamma$ (with the angles being expressed in terms of radians) or in the buffer sector T, in which $\theta > 2\pi - \gamma$.

The result from the architecture of the control system 34 is that the tasks necessary to the operation of the forming unit 9 are shared between the master control unit 36 and the slave controllers 37 that are tied to it.

The tasks attributed to the controllers 37 comprise the effective directing of the forming stations 10 (in particular two stations 10 by each controller 37), the taking of measurements, and the analysis of these measurements for deducing from them singular points S. These tasks are carried out in real time, as the cycle advances, and require a rapid processing.

The tasks attributed to the control unit 36 comprise the analysis of data communicated at each end of the cycle by the controllers 37, making the decision as to whether it is appropriate or not to correct the forming instructions CF, as well as the optional issuing and loading of corrected forming instructions CF. These tasks are carried out for each forming station 10 in delayed time, during which the latter passes through the buffer sector T when the instruction corrections are provided to be applied from one cycle to the next, or during several cycles, when the control unit 36 makes calculations of characteristic points on the basis of averages of measurements made over several cycles.

This sharing of tasks makes it possible to limit both the volume of data to be processed and the speed at which these data are to be processed by the control unit 36. In this way, the calculations necessary to the correct conduct of the forming operations do not limit the pace of production.

As is furthermore shown in a diagram in FIG. 2, the heating unit 4 is also equipped with a dedicated control system 35 that comprises a master control unit 46 and a series of slave controllers 47 tied to the master control unit 46.

The master control unit 46 is computerized and comprises:

A memory 48 into which programs for directing heating modules 5 are entered,

A processor 49 connected to the memory 48 for applying the instructions of the programs, and A communication interface 50 connected to the processor 49 for communication with external communicating entities.

Each slave controller 47 is a programmable logic controller of the type described in W. Bolton, *Programmable Logic Controllers*, Newnes, 5$^{th}$ Edition, 2009.

More specifically, each controller 47 comprises:

A memory 51 into which programs for directing at least one heating module 5 are entered, A processor 52 connected to the memory 51 for applying the instructions of the program, A communication interface 53 connected to the processor 49 for communication with the master control unit 46 via its own communication interface 50, An input interface 54 connected, on the one hand, to the processor 52, and, on the other hand, to the heat sensor 20, An output interface 55 connected, on the one hand, to the processor 52, and, on the other hand, to the power variable-speed drive unit 19 and to the motors 14, 18 of the driving wheel 13 and the fan 17.

The controller 47 is programmed to carry out the following operations:

Directing the heating module or each heating module 5 with which it is associated, according to a heating instruction CC that is loaded (i.e., written) into the memory 51;

Based on the measurement of temperature (denoted T) obtained from the heat sensor 20, plotting the instantaneous thermal profile of each preform 3, which can come in the form of a mean temperature measured for the entire preform 3, of a set of multiple temperature values at different heights in the body of the preform 3, or a curve providing the temperature T based on the height (denoted h) in the preform 3;

Analyzing the thermal profile and extracting from it the coordinates of at least one singular point W (for example, at a given height in the vicinity of the neck);

Communicating for each preform 3, or at predetermined intervals, the coordinates of the singular point W to the master control unit 46.

The heating instruction CC can comprise a power value delivered by the variable-speed drive unit 19, a speed of rotation of the motor 18 of the fan 17, or else a speed of rotation of the driving wheel 13 (and therefore, consequently, a travel speed of the preforms 3—in other words, the pace of production of the oven 4).

The processor 49 of the master control unit 46 is, for its part, programmed for:

Directing its slave controllers 47,

Taking into account the singular point or each singular point W communicated by each controller 47, Calculating a characteristic point CW from the singular point(s) W. This characteristic point CW can be the singular point W communicated at a predetermined time by the controller 47 or an average of singular points W communicated during a predetermined period by the same controller 47;

Comparing this characteristic point CW with a theoretical point entered in advance into the memory 48 of the master control unit 46 and corresponding to a preform that has provided a model container, If a variation is declared between the characteristic point CW and the theoretical point, issuing a corrected heating instruction CC, comprising a value modified for the power of the variable-speed drive unit 19, or else for the speed of rotation of the motor 18 of the fan 17 or of the driving wheel 13;

Loading the corrected heating instruction CC into the controller or each controller 47 directed by the master control unit 46;

If necessary, communicating the characteristic point CW to the central control unit 33.

When no variation is declared between the characteristic point CW and the theoretical point, no corrected heating instruction is issued by the processor, so that the controller 47 continues directing the (or each) heating module 5 according to the preceding heating instruction CC.

As is illustrated in the figures, the central control unit 33 of the installation 1 comprises:

A memory 56 into which programs for directing the control units 36, 46 of the dedicated control systems 34, 35 are entered, with these control units 36, 46 thus being tied to the central control unit 33 (in other words, the control units 36, 46 are masters of the controllers 37, 47 and slaves of the central control unit 33);

A processor 57 connected to the memory 56 for applying the instructions of the programs, and A communication interface 58 connected to the processor 57 for communication with the control units 36, 46.

The processor 57 of the central control unit 33 is programmed to direct each control unit 36, 46, according to a processing instruction CF, CC that is loaded into the processor 39, 49 of each control unit 36, 46.

It is seen that the control units 36, 46 can transmit to the central control unit 33 the characteristic points CS, CW.

This transmission makes it possible for the processor 57 of the central control unit 33 to direct the operation of each processing unit 4 (or 9) as a function of measurements obtained from another processing unit 9 (or 4).

More specifically, the processor 57 of the central control unit 33 is programmed for:

Taking into account at least one characteristic point CS, CW that is communicated to it by a first control unit 36 (or 46), Comparing this characteristic point with a theoretical point entered into the memory 56 of the central control unit 33, If a variation is declared between the singular point and the theoretical point, issuing a corrected processing instruction CC, CF intended for a second control unit 46 (or 36), and Loading this corrected processing instruction CC, CF into the second control unit 46 (or 36).

This sequence of operations can be triggered in particular in the case where a first instruction correction made at the level of a dedicated control system 34 (or 35) to a given processing unit 9 (or 4) does not eliminate (or does not diminish), in the following cycle (or in a predetermined number of cycles), the variation noted between the characteristic point CS, CW and the theoretical point.

It can also be triggered in the case where it is known (and therefore programmed) that only the correction of a processing instruction CC, CF intended for the second control unit 46 (or 36) is able to affect (and therefore to correct) the measurements made in the first processing unit 9 (or 4).

In the example illustrated, the quality of the final container 2 obtained at the outlet of the forming unit 9 depends in particular on the heating temperature T, which is regulated in the heating unit 4. The temperature T for heating preforms 3 can actually vary as a function of:

The intensity of the radiation delivered by the heating modules 5, which depends on the electrical power that is delivered to them, modulated by the variable-speed drive unit 19, The power of the ventilation, regulated by the speed of rotation of the fan 17, which is modulated by the motor 18, The travel speed of the preforms 3, which is modulated by the motor 14 of the wheel 13.

Thus, it is understood that an instruction change CC affecting the heating temperature T within the heating unit 4 will have the effect of a modification of the blow-molding curve, and in particular the position of the singular point S detected in the latter by the processor 39 of the controller 37. This instruction change CC is made according to the following procedure, thanks to the programming described above:

After having plotted the blow-molding curve, the controller 37 analyzes it and extracts from it the coordinates of the singular point S (typically the point B) and communicates these coordinates to the control unit 36 of the forming unit 9;

Having declared that a modification of the forming instruction CF is inadequate for obtaining the desired correction of the position of the singular point S on the blow-molding curve in the following cycle or in a predetermined number of following cycles, the control unit 36 communicates the coordinates of the characteristic point CS to the central control unit 33;

The central control unit 33, programmed for this purpose, determines that the blow-molding curve can be corrected using a modification of the heating temperature T, or of the speed of rotation of the fan 17, or else the travel speed of the preforms 3 (in other words, the speed of rotation of the wheel 13) and issues a corrected heating instruction CC to the attention of the control unit 46 of the heating unit 4;

The central control unit 33 loads the thus corrected heating instruction CC into the control unit 46 of the heating unit 4;

The control unit 46 directs the controllers 47 by applying the thus corrected heating instruction CF.

This architecture has the following advantages.

First of all, it makes it possible to unclog the control system 32 of the installation by sharing the tasks among multiple control levels connected to one another according to the master-slave principle:

The controllers 37, 47 are programmed to conduct low-level operations over the short term, including the (analog) control of mechanical components;

The control units 36, 46 are programmed to conduct intermediate-level operations over a relatively longer term, including the calculation of characteristic points (in particular, averages) as a function of measurements received from the controllers 37, 47, the comparison with reference values, the issuing of instructions (optionally corrected) and the directing, as a function of these instructions, of the controllers 37, 47;

The central control unit 33 is programmed to conduct higher-level operations over the long term, including taking into account data communicated by the control units 36, 46, the issuing of instructions, and directing, as a function of these instructions, the control units 36, 46.

Secondly, this architecture makes possible a dialogue between the different processing units 4, 9 of the installation 1 without it being necessary to centralize all of the operations within the central control unit 33, to which only tasks of decision-making, correcting instructions CF, CC and loading corrected instructions CF, CC into the control units 36, 46 that are tied to it can be assigned.

Thirdly, thanks to the dialogue between the different control levels, the programming of the entire control system 32 can be centralized on the higher level, i.e., in the central control unit 33, which can relay to the control units 36, 46 the program that is dedicated to them as well as the program dedicated to the controllers 37, 47, with the control units 36, 46 relaying in their turn to the controllers 37, 47 the program dedicated to the latter. It is therefore unnecessary to load the programs individually into each controller 37, 47 or even into each control unit 36, 46. The result is a simplification of the programming of the installation and an increased productivity.

Fourthly, this architecture makes it possible to carry out a transverse retroaction, i.e., to control a modification of the instruction applied by a processing unit—typically the heating unit 4—as a function of measurements made within another processing unit—typically the forming unit 9. The quality of the containers produced is improved.

The invention claimed is:

1. System (34) for controlling a unit (9) for forming containers (2) from blanks (3) made of thermoplastic material equipped with a series of forming stations (10), each equipped with a mold (11) with the imprint of a container (2), with this system (34) being characterized in that it comprises a master control unit (36) and a series of slave controllers (37) tied to the master control unit (36) and each associated with at least one forming station (10), each controller (37) being programmed for:

Directing the forming station or each associated forming station (10) according to a forming instruction (CF) that is loaded into the controller (37);

Taking into account a measurement of pressure in the mold (11),

Based on this measurement, plotting a blow-molding curve describing the change in the fluid pressure in the mold (11), Analyzing the blow-molding curve and extracting from it the coordinates of at least one singular point (S), Communicating the singular point (S) to the control unit (36), and in that the master control unit (36) is programmed for:

Directing the controllers (37),

Taking into account the singular point or each singular point (S) communicated by each controller (37), Calculating a characteristic point (CS) that is a function of the singular point(s) (S), Comparing the characteristic point (CS) with a theoretical point memorized in the control unit (36), If a variation is declared between the characteristic point and the theoretical point, issuing a corrected forming instruction (CF), Loading the corrected forming instruction (CF) into the controller or each controller (37).

2. System (34) according to claim 1, wherein the characteristic point (CS) is an average of singular points (S) communicated by the same controller (37) or by multiple controllers (37).

3. System (34) according to claim 1, wherein each controller (37) is associated with two forming stations (10).

4. System (34) according to claim 1, wherein with each forming station (10) being equipped with an injection device comprising a block (26) of actuators directed by the controller (37), the forming instruction (CF) comprises values of pressure and/or of the flow rate of a fluid delivered by said block, or a control time of the actuator block.

5. System (34) according to claim 1, wherein with each forming station (10) comprising a moving part (28) whose movement is directed by the controller (37), the forming instruction (CF) comprises a movement profile of the part (28).

6. System (34) according to claim 1, wherein with the forming stations (10) describing a path including a forming sector (F) extending from a loading point (21) of the blanks (3) to an unloading point (22) of the formed containers (2), and a buffer sector (T), complementary to the forming sector (F) and extending from the unloading point (22) to the loading point (21), the control unit (36) is programmed for loading the modified forming instruction (CF) into the controller or each controller (37) when the forming station or each associated forming station (10) is in the buffer sector (T).

7. System (34) according to claim 1, wherein with the forming unit (9) comprising a wheel (23) on which are mounted the forming stations (10), and an angular position sensor (24) of the wheel (23), each controller (37) is programmed for taking into account the instantaneous angular position of the wheel (23), deducing from it the angular position of the forming station or each associated forming station (10), and plotting the blow-molding curve from pressures measured at times corresponding to each of these angular positions.

8. Unit (9) for forming containers from blanks made of thermoplastic material, equipped with a series of forming stations (10), each equipped with a mold (11) with the imprint of a container, wherein it is also equipped with a control system (34) according to claim 1.

9. Installation (1) for producing containers (2) from blanks (3) made of thermoplastic material, wherein it is equipped with a forming unit (9) according to claim 8.

10. System (34) according to claim 2, wherein each controller (37) is associated with two forming stations (10).

* * * * *